(12) United States Patent
Sekiya et al.

(10) Patent No.: US 8,575,878 B2
(45) Date of Patent: Nov. 5, 2013

(54) ENERGY CONVERTER

(75) Inventors: Tetsuo Sekiya, Yokohama (JP);
Kiyotsugu Narita, Nagoya (JP)

(73) Assignee: TBK Co., Ltd, Tokyo (JP)

( * ) Notice: Subject to any disclaimer, the term of this patent is extended or adjusted under 35 U.S.C. 154(b) by 58 days.

(21) Appl. No.: 13/131,306

(22) PCT Filed: Nov. 26, 2009

(86) PCT No.: PCT/JP2009/006409
§ 371 (c)(1),
(2), (4) Date: Jun. 24, 2011

(87) PCT Pub. No.: WO2010/061618
PCT Pub. Date: Jun. 3, 2010

(65) Prior Publication Data
US 2011/0248664 A1 Oct. 13, 2011

(30) Foreign Application Priority Data
Nov. 26, 2008 (JP) .................... 2008-300287

(51) Int. Cl.
*H02P 1/00* (2006.01)

(52) U.S. Cl.
USPC . 318/556; 318/653; 318/400.29; 318/400.17; 318/400.33; 318/807; 310/156.43; 310/216.071; 310/236; 310/261.1; 310/12.19; 324/320; 324/240; 324/233; 324/202; 324/228; 335/222; 335/100; 335/224; 335/226; 335/220

(58) Field of Classification Search
USPC .............. 318/653, 661, 400.42, 400.29, 721, 318/400.36, 400.17, 254.2, 156.43, 400.33, 318/807; 310/156.43, 261.1, 156.53, 179, 310/195, 180, 156.12, 178, 12.19, 12.18, 310/12.06, 12.01, 12.21, 181, 166, 164, 310/216.091, 71, 83, 216.071, 214, 310/216.045, 260, 254.1; 324/320, 240, 324/233, 227, 242, 225, 207.24, 207.07, 324/202, 239, 230, 236, 216, 228; 335/222, 335/100, 224, 226, 220
See application file for complete search history.

(56) References Cited

U.S. PATENT DOCUMENTS 3,668,448 A * 6/1972 Hayasaka ...................... 310/166
4,663,536 A * 5/1987 Roesel et al. ..................... 290/7
(Continued)

FOREIGN PATENT DOCUMENTS

| CN | 1668141 A | | 9/2005 |
|---|---|---|---|
| JP | 57131875 A | * | 8/1982 |
| JP | 10-108426 A | | 4/1998 |
| JP | 10108426 A | * | 4/1998 |
| JP | 11-127559 A | | 5/1999 |
| JP | 11-332186 A | | 11/1999 |

(Continued)

OTHER PUBLICATIONS

Notification of First Office Action, dated May 27, 2013, issued in corresponding CN Application No. 200980155178.0, 17 pages in English and Chinese.

*Primary Examiner* — Eduardo Colon Santana
*Assistant Examiner* — Jorge Carrasquillo
(74) *Attorney, Agent, or Firm* — Sughrue Mion, PLLC

(57) ABSTRACT

An energy converter includes a magnetism generation mechanism unit that generates a magnetic field when connected to an AC electrical power source, and a rotating mechanism unit having a single turn coil array member in which a plurality of single turn coils is disposed at a predetermined interval and a soft magnetic metal plate disposed on a side of the single turn coil array member opposite to the magnetism generation mechanism unit. The rotating mechanism unit is structured such that the single turn coil array member faces the magnetism generation mechanism unit across a predetermined magnetic gap and rotary driven by the magnetic field. Here, a drive signal period of the electrical power source is a period that maximizes an eddy current generated in the soft magnetic metal plate.

8 Claims, 11 Drawing Sheets

(56) References Cited

U.S. PATENT DOCUMENTS

| | | | |
|---|---|---|---|
| 7,105,974 B2 * | 9/2006 | Nashiki | 310/185 |
| 2006/0061442 A1 * | 3/2006 | Brooks | 335/220 |
| 2006/0279164 A1 * | 12/2006 | Blum | 310/261 |
| 2007/0228736 A1 * | 10/2007 | Smushkovich | 290/42 |

FOREIGN PATENT DOCUMENTS

| | | | |
|---|---|---|---|
| JP | 2001-057762 A | | 2/2001 |
| JP | 2001057762 A | * | 2/2001 |
| JP | 2002-272022 A | | 9/2002 |
| JP | 2002-345229 A | | 11/2002 |

* cited by examiner

ENERGY CONVERTER

CROSS REFERENCE TO RELATED APPLICATION

This application is a National Stage of International Application No. PCT/JP2009/006409 filed Nov. 26, 2009, claiming priority based on Japanese Patent Application No. 2008-300287, filed Nov. 26, 2008, the contents of all of which are incorporated herein by reference in their entirety.

TECHNICAL FIELD

The present invention relates to an energy converter for converting electrical energy to mechanical energy, thermal energy, and the like.

BACKGROUND ART

Energy converters are proposed as described, for example, in Japanese Unexamined Patent Publication Number 2001-69734. Such converters have been developed by extending the function of induction motors in order to realize application diversification in which a magnetism generation mechanism unit constituted by a stator that generates a magnetic field and a rotating mechanism unit having a rotor which is rotary driven or heated by the magnetic field generated by the magnetism generation mechanism unit are provided as separate independent units, and they are assembled together so as to be magnetically coupled when used as an energy converter.

The rotor of the energy converter includes a soft magnetic metal material and a good conductor surface section stacked on the metal material. Inner peripheries of a plurality of concave sections provided in the good conductor surface section magnetically form single turn coils. When a rotating or alternating magnetic field driven by an electrical power source having a predetermine frequency is exerted on the array of coils for driving the stator, a current is generated in the array of single turn coils and the current interacts with the rotating or alternating magnetic field, whereby inductive electromagnetic energy is generated. In this way the electrical energy is converted to mechanical or thermal energy.

In the mean time, while the structure in which the magnetism generation mechanism unit and the rotating mechanism unit provided as separate independent units are assembled has an advantage that the rotating mechanism unit can be separated from the magnetism generation mechanism unit and handled independently, it poses a problem that the magnetic gap length between the magnetism generation mechanism unit and the rotating mechanism unit inevitably becomes long and the energy output of the rotating mechanism unit is reduced. This is due to the structural constraint in which the rotating mechanism unit is stacked on the magnetism generation mechanism unit and the secondary induced current generated in the rotating mechanism unit is reduced as the distance of the rotating mechanism unit from the magnetism generation mechanism unit is increased.

When the magnetism generation mechanism unit and the rotating mechanism unit are integrally formed, the magnetic gap length is typically set to 1 mm or less. In the present structure in which the magnetism generation mechanism unit and the rotating mechanism unit provided as separable independent units are combined, the magnetic gap length between the magnetism generation mechanism unit and rotating mechanism unit is set, in most cases, to about 10 mm as a design parameter by taking into account, as well as current situation of induction heater rice cookers, the security requirements that the leakage does not cause any adverse and harmful effects on peripheral devices and human bodies in embodying new functional development, such as a cordless electrical power source of an underwater rotor, a new concept of heat/power characteristics in which heat source and power source of the rotor are obtained at the same time from a commercial electrical power source, and various forms of effective use of exhaust heat from devices and equipment, while maintaining the utilization efficiency.

The present invention has been developed in view of the circumstances described above, and it is an object of the present invention to provide a new electrical power transfer method usable with a large magnetic gap length. That is, it is an object of the present invention to provide an energy converter capable of securing sufficient and practicable energy output from the rotating mechanism unit by providing an efficient transfer method of effective electrical power to secondary metal load in the rotating mechanism unit and improving energy transfer performance from the magnetism generation mechanism unit to the rotating mechanism unit.

In the mean time, by positively leveraging the easy separable function of the two mechanism units, the energy converter of the present invention may be used by selecting a specialized rotating mechanism unit that satisfies the requirements of the intended purpose or environment under which it is used.

DISCLOSURE OF INVENTION

An energy converter of the present invention is a converter, including:

a magnetism generation mechanism unit that generates a magnetic field when connected to an AC electrical power source; and a rotating mechanism unit having a single turn coil array member in which a plurality of single turn coils is disposed at a predetermined interval and a soft magnetic metal plate disposed on a side of the single turn coil array member opposite to the magnetism generation mechanism unit, the rotating mechanism unit being structured such that the single turn coil array member faces the magnetism generation mechanism unit across a predetermined magnetic gap and being rotary driven by the magnetic field, wherein a drive signal period of the electrical power source is a period that maximizes an eddy current generated in the soft magnetic metal plate.

Here, the drive signal period of the electrical power source that maximizes an eddy current generated in the soft magnetic metal plate is, for example, a period that satisfies a condition represented by Formula (1) given below or a period that maximizes a B-H hystereresis loop area formed by magnetic field strength H of the magnetism generation mechanism unit and induced magnetic flux density B in the rotating mechanism unit.

In the energy converter described above, it is preferable that a drive signal period $T_g$ of the electrical power source satisfies a condition of Formula (1) given below.

$$T_g = 4 t_d \tag{1}$$

where, $t_d$ is a response time for eddy current due to a magnetic flux penetrant diffusion wave into the soft magnetic metal plate to become maximum with respect to predetermined stepwise voltage application by the electrical power source and $t_d$ is determined experimentally.

Further, it is also preferable that the drive signal period $T_g$ of the electrical power source is a period that maximizes a B-H hystereresis loop area formed by magnetic field strength H of the magnetism generation mechanism unit and induced magnetic flux density B in the rotating mechanism unit.

As the drive signal period that maximizes the B-H hystereresis loop area and the drive signal period that maximizes the induced magnetic flux density B are substantially correspond to each other, the drive signal period $T_g$ of the electrical power source may be obtained from the induced magnetic flux density B.

Preferably, the energy converter described above satisfies, at the drive signal period $T_g$ of the electrical power source, a resistance matching condition, with the magnetic gap as the matching plane, represented by Formula (2) given below.

$$R_g + R_1 = n^2 R_3 \qquad (2)$$

where, $R_g$ is an internal resistance of the electrical power source, $R_1$ is a winding resistance of the magnetism generation mechanism unit, $R_3$ is a combined resistance of an eddy current resistance due to flow of eddy current generated by the penetrant diffusion of magnetic flux of the magnetic field into the soft magnetic metal plate and a resistance of the single turn coil array member, and n is an equivalent effective turn ratio of the magnetism generation mechanism unit when a coil turn of the rotating mechanism unit is taken as one turn with the magnetic gap as the matching plane.

Preferably, the rotating mechanism unit is a unit that includes an epicyclic gear mechanism.

Preferably, the energy converter described above further includes a control unit for controlling the drive signal period $T_g$ of the electrical power source and application voltage such that the number of mechanical rotations of the rotating mechanism unit is maximized.

The magnetism generation mechanism unit may be a flat magnetism generation mechanism unit in which coils are disposed in a circle, and the single turn coil array member and the soft magnetic metal plate may have a flat shape or a disk like structure.

Further, the magnetism generation mechanism unit may have a cylindrical structure, the single turn coil array member of the rotating mechanism unit may have a basket like structure, and the soft magnetic metal plate may have a hollow cylindrical structure.

The energy converter of the present invention includes a magnetism generation mechanism unit that generates a magnetic field when connected to an AC electrical power source, and a rotating mechanism unit having a single turn coil array member in which a plurality of single turn coils is disposed at a predetermined interval and a soft magnetic metal plate disposed on a side of the single turn coil array member opposite to the magnetism generation mechanism unit, the rotating mechanism unit being structured such that the single turn coil array member faces the magnetism generation mechanism unit across a predetermined magnetic gap and being rotary driven by the magnetic field, wherein a drive signal period of the electrical power source is a period that maximizes an eddy current generated in the soft magnetic metal plate. This allows effective energy transfer performance from the magnetism generation mechanism unit to the rotating mechanism unit to be improved.

In the energy converter described above, if the drive signal period $T_g$ of the electrical power source is a period that satisfies a condition represented by Formula (1) given above or a period that maximizes a B-H hystereresis loop area formed by magnetic field strength H of the magnetism generation mechanism unit and induced magnetic flux density B in the rotating mechanism unit, the eddy current may be sustained at a large value and effective energy transfer performance from the magnetism generation mechanism unit to the rotating mechanism unit may be improved.

Further, if, at the drive signal period $T_g$ of the electrical power source, a resistance matching condition, with the magnetic gap as the matching plane, represented by Formula (2) given above is satisfied, electrical power matching is achieved through the rotary matching transformer function with the magnetic gap as the matching plane and the energy transfer from the magnetism generation mechanism unit to the rotating mechanism unit may be performed more efficiently, whereby sufficient and practical energy output from the rotating mechanism unit may be ensured with a large magnetic gap of about 10 mm.

BEST MODE FOR CARRYING OUT THE INVENTION

Figure 1A:
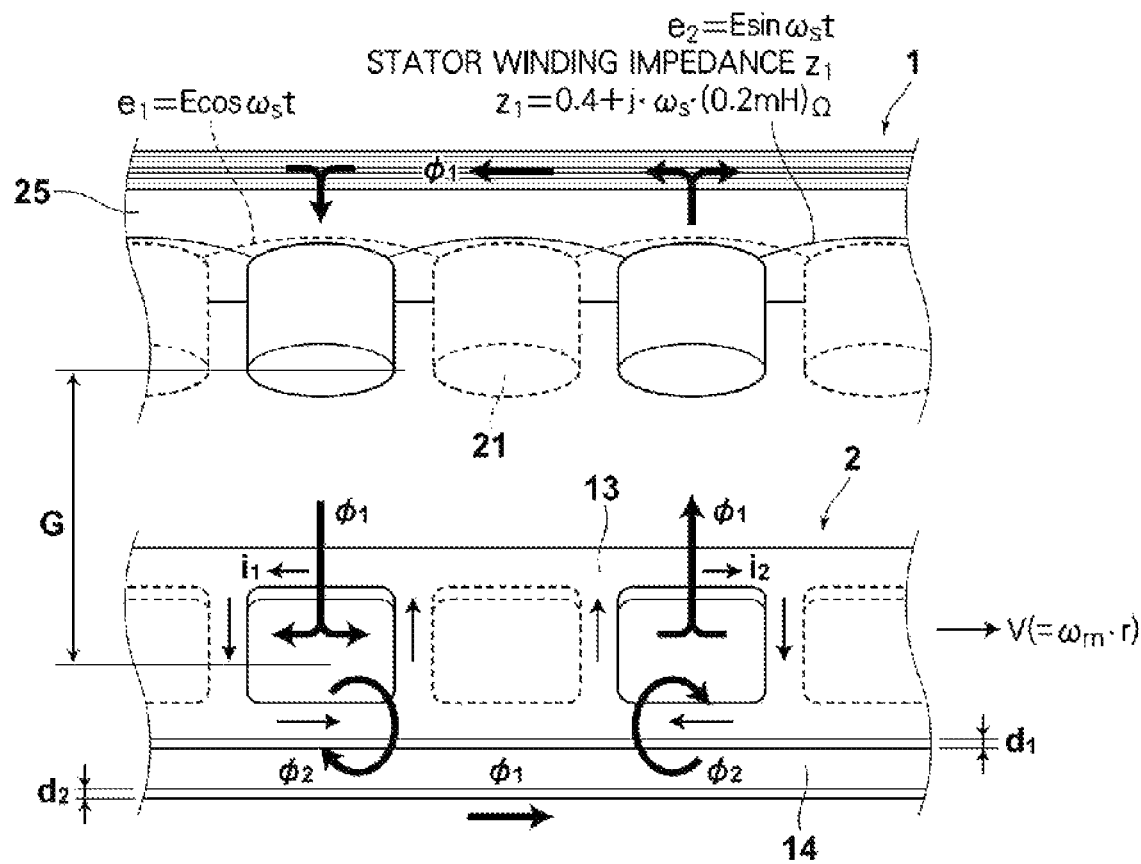
FIG. 1A illustrates a drive principle of an induction motor according to an embodiment of the present invention.

Conventional energy converters include induction motors, induction heaters, and the like. Joule heat is generated in the secondary cooking pot (pan) of an induction heater by eddy current. The secondary side rotor of an induction motor, like the secondary side cooking pot, can be removed and replaced easily as it has no permanent magnet and has a robust and simple member structure made of a compound material of iron and copper or aluminum, or iron mass. Power of mechanical load, loss, and Joule heat are generated in the secondary side rotor. In a simple equivalent circuit representation, the approximate load of an induction machine is represented by Rr/s, and secondary side output (Rr/s) Ir² is represented by the sum of a portion of the electrical power converted to power source $(1/s-1)RrIr^2$ and Joule heat loss $RrIr^2$. Here, Rr is a total resistance of the rotor viewed from the primary side, s is slip, and Ir is an induced current in the secondary side rotor viewed from the primary side.

In each of the induction motor and induction heater, energy is supplied to the secondary metal load constituted by copper (or aluminum) and a soft magnetic metal plate through electromagnetic induction. The present invention may provide a new energy converter (heat/power combined system) in which the induction motor and induction heater are combined through a new power transfer method and a new structural configuration in which the system can be separated into magnetism generation mechanism unit and rotating mechanism unit. This allows the exhaust heat of the rotor, which has been heretofore subjected to a forced cooling, to be utilized effectively through, for example, electricity and a heat/power energy generator. This allows the overall energy efficiency to be improved and the rotating mechanism unit to be functioned as a dedicated induction heater under the magnetic field generation mechanism unit in which a rotating magnetic field is electrically changed to an alternating magnetic field. Further, either one of the magnetism generation mechanism unit and rotating mechanism unit may be made, as it were, into "the state of hidden in the leaves" and utilized, or it may be used under a special environment, such as underwater or under a high temperature of around 400° C. In particular, provision of the structural configuration in which exhaust heat from devices and equipment is allowed to be utilized effectively and a new electric power transfer method supporting the effective use of exhaust heat constitute a new effective energy utilization method which is a conceptual proposal of "Many small make a great" appropriate for the twenty-first century.

The subject matter of the present invention is how to generate a strong and slightly delayed induced electromagnet in the rotor, which is the secondary metal load, having a large magnetic gap length of 10 mm, and the present invention has been developed by (qualitatively) understanding the behavior of induced current (eddy current) induced inside of the soft magnetic metal plate corresponding to the metal load and taking particular note of the eddy current resistance.

In the present invention, the energy converter is regarded as a single phase power transformer having a large magnetic gap length and secondary induced equivalent magnet is generated by increasing induced current generated in the rotating mechanism unit on the secondary side at a certain delayed phase, and combining two phases. The torque generated between the primary and secondary sides gives motion to the mechanical load and the equilibrium point with the load in a system including the negative feedback system becomes the operating point of mechanical output. At the same time, power matching with the resistive metal load of the rotor has been studied and during the course of these studies, effective electrical power transfer method for energy (heat and power) has been studied.

The energy converter of the present invention includes a magnetism generation mechanism unit that generates a magnetic field when connected to an AC electrical power source, and a rotating mechanism unit having a single turn coil array material in which a plurality of single turn coils is disposed in a circumferential direction at a predetermined interval and a thin soft magnetic metal plate stacked on the rear side of the single turn coil array material (surface of the single turn coil array material not facing the magnetism generation mechanism unit), the rotating mechanism unit being structured such that the single turn coil array material faces the magnetism generation mechanism unit across a predetermined magnetic gap and rotary driven by the magnetic field. The energy converter is driven by a drive signal frequency of the electrical power source that maximizes the induced current (eddy current) generated in the thin soft magnetic metal plate. The drive signal of the electrical power source has a drive signal frequency $f_g$ that causes the area of a B-H hysteresis loop formed by magnetic field strength H of the magnetism generation mechanism unit and induced magnetic flux density B in the rotating mechanism unit to become maximum. Otherwise, the drive signal period $T_g$ satisfies, as the essential condition, Formula (1) given below and satisfies, as the sufficient condition, the resistance matching represented by Formula (2) given below with the magnetic gap plane as the matching plane.

$$T_g = 4t_d \quad (1)$$

$$R_g + R_1 = n^2 R_3 \quad (2)$$

where, $t_d$ is a response time for eddy current due to a magnetic flux penetrant diffusion wave into the soft magnetic metal plate becomes maximum with respect to a predetermined stepwise voltage application by the electrical power source and $t_d$ is determined experimentally. $R_g$ is an internal resistance of the electrical power source, $R_1$ is a winding resistance of the magnetism generation mechanism unit, and $R_3$ is a combined resistance of an eddy current resistance due to the flow of eddy current generated by the penetrant diffusion of magnetic flux of the magnetic field generated by the drive signal period of the electrical power source and the applied voltage into the thin soft magnetic metal plate of the rotating mechanism unit at a predetermined magnetic gap and a resistance of the single turn coil array plate in which the eddy current resistance accounts for the majority. The n represents an equivalent effective turn ratio of the magnetism generation mechanism unit when the coil turn of the rotating mechanism unit is taken as one turn with the magnetic gap plane as the matching plane.

The power performance of the energy converter determined by the drive signal period of the electrical power source is properly adjusted electrically by the electrical angle and mechanically by epicyclic gear mechanism unit. In particular, the application range of the present converter may be broadened by a rotating mechanism unit having an epicyclic gear mechanism unit therein.

Further, the magnetism generation mechanism unit and the rotating mechanism unit may be separate, independent units or they may be integrally combined.

In particular, in a unified housing structure, the magnetic gap length becomes narrow and general induction machine design is performed. That is, in the heat/power characteristic rotor constituted by the single turn coil array material and thin soft magnetic metal plate and generates power and heat, the rotor is changed to a BLV law power based rotor in which the thin soft magnetic metal plate with a thickness of 1 to 3 mm is replaced with a thick would core magnetic path material with a thickness of 5 to 10 mm.

Figure 10:
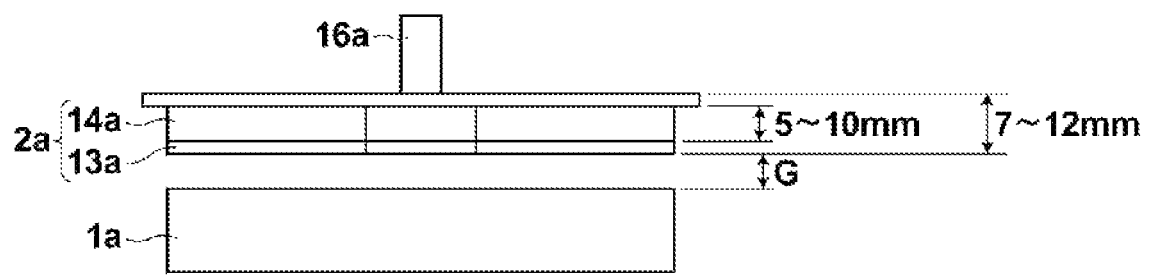
FIG. 10 is a comparative conceptual diagram, illustrating a structure of a wound core type rotor.

FIG. 10 is a schematic configuration diagram of a power dedicated energy converter. As illustrate in FIG. 10, the power dedicated energy converter includes stator excitation source 1a (magnetism generation mechanism unit) and rotating mechanism unit 2a. Rotating mechanism unit 2a includes a single turn aluminum chain array 13a and wound core 14a with a thickness of 5 to 10 mm stacked on top of each other. Rotating mechanism unit 2a is rotary driven by a magnetic field generated by stator excitation source 1a and power is outputted from output axis 16a continued from rotating mechanism unit 2a.

This embodiment has a flat type structure, but the present invention may also be applied to a cylindrical type. That is, it can be easily understood that the single turn coil array material and thin soft magnetic metal plate of the flat type rotor may be modified into a basket-shaped hollow cylinder single turn coil array material and a pipe shaped hollow circular cylinder soft magnetic metal plate respectively, and the thick would core magnetic path material of the power based rotor may be modified into a laminated circular magnetic steel material. In the cylindrical type having a hollow cylindrical rotor, in particular, a plurality of blades or spiral irregularity may be provided inside of the hollow cylindrical rotor and water or air may be introduced therein to give heat and rotational force at the same time.

Hereinafter, description will be made mainly focusing on a flat structural configuration constituted by a heat/power characteristic rotor.

The term "a single turn coil array plate in which a plurality of single turn coils is disposed at a predetermined interval in a circumferential direction" as used herein has a broad meaning and includes those having a structure in which a single turn coil is magnetically formed by receiving a magnetic field generated by the magnetism generation mechanism unit, such as a disk having a plurality of openings disposed at a predetermined interval in a circumferential direction and a single turn coil array is magnetically formed by inner peripheries of the plurality of openings by receiving a magnetic field generated by the magnetism generation mechanism unit. The term includes not only the structures in which single turn coils are actually provided but also those in which two turn coils are provided or trapezoidal coils are skewed.

The thin soft magnetic metal plate closely stacked on the rear side of the single turn coil array plate is made of an isotropic magnetic steel or iron and shaped in a circular plate with a thickness of about 2 to 4 mm. The rotor constituted by the single turn coil array plate and soft magnetic metal plate functions as a smooth, non-convex rotor. Replacement of the soft magnetic metal plate of the present example with a wound core magnetic path with a thickness of about 4 to 10 mm will result in a flat type of a typical induction machine structure.

Figure 3:
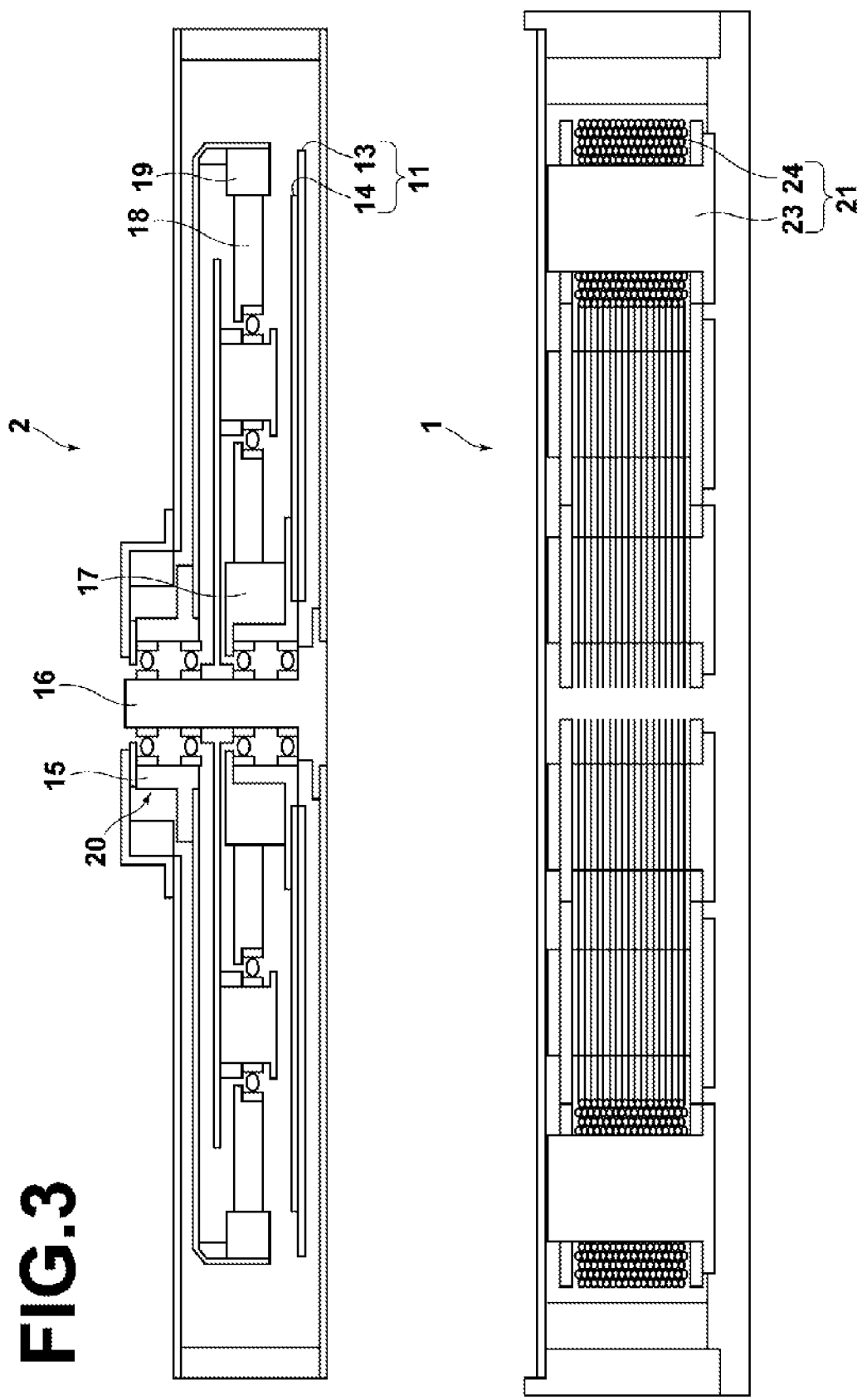
FIG. 3 is a vertical cross-section view of a separable flat induction motor having an epicyclic gear.

Hereinafter, an induction motor, which is an embodiment of the energy converter of the present invention, will be described with reference to the accompanying drawings. As illustrated in FIG. 3, the induction motor is constituted by magnetism generation mechanism unit 1 and rotating mechanism unit 2 which are structured as separate, independent units and to be assembled.

Magnetism generation mechanism unit 1 includes a short cylindrical stator, and a plurality of (e.g., eight) drive coils 21, each having magnetic core 23 (e.g., wound core) with conductive wire 24 (e.g., Ritz winding) wound thereon, is implanted on a disk shaped (or rectangular) soft magnetic metal base (e.g., wound core base) and the concentrically arranged magnetic core coils and the soft magnetic metal base are integrally buried in an insulating member. A high thermal conductive thermoplastic material is preferably used as the insulating member. A drive coil array for generating a rotating magnetic field is formed by eight drive coils 21 disposed concentrically and at an equal distance.

Figure 4:
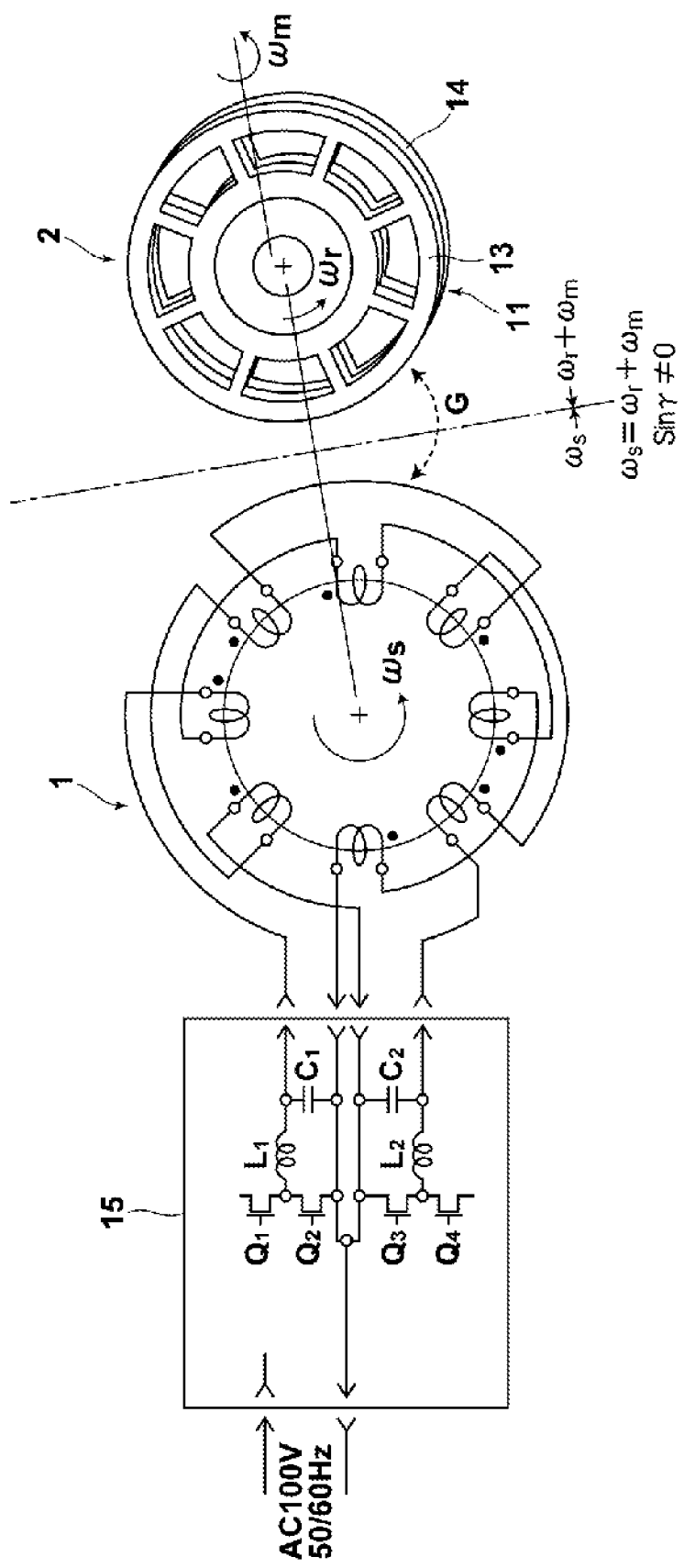
FIG. 4 illustrates a flow of power.

A current with a predetermined voltage and frequency ($1/T_g=f_g$) is applied to the drive coil array of drive coils 21 from inverter circuit 15 (electrical power source) shown in FIG. 4 and whereby a rotating magnetic field is generated. Inverter circuit 15 receives a commercial voltage, single phase 100V, 50/60 Hz, and outputs a sin signal and a cos signal, each having a predetermined voltage and frequency ($1/T_g$) to magnetism generation unit 1. That is, inverter circuit 15 is a circuit that outputs a two phase signal by performing phase and frequency conversions on the received commercial single phase power. A conducting circuit extending from inverter circuit 15 connects drive coils 21 located at every other position in series and is connected to sin side of the electrical power source, and another conducting circuit extending from inverter circuit 15 connects the remaining drive coils 21 in series and is connected to cos side of the electrical power source so that the direction of generated magnetic fluxes reversed alternately, whereby the drive coil array is driven in two-phases and a rotating magnetic field is generated on the magnetic gap plane.

Here, the description has been made of a two-phase drive, but a three-phase drive is also possible. The drive signal to be outputted may be various types of signals, including a sine wave signal, a square wave signal, a sine wave signal obtained by filtering a pulse width modulation signal, and the like.

Rotating mechanism unit 2 includes disk shaped rotor 11 rotatably held around fixed axis 16 fixed to the housing. Rotor 11 includes single turn coil array disk 13 (single turn coil array plate) and thin soft magnetic metal plate 14 tightly attached on the rear surface of single turn coil array disk 13. In the present embodiment, output 20 of rotating mechanism unit 2 is provided through epicyclic gears 17, 18, and 19.

Single turn coil array disk 13 is a disk made of, for example, copper or aluminum and includes a plurality of openings (eight, the same number as that of drive coils 21), in which single turn coils are magnetically formed by the inner peripheries of the openings. The present experimental sample is a rotor of a CD size and thickness $d_1$ of each single turn coil is about 2.5 mm with a pure resistance of about 0.5 mΩ. Soft magnetic metal plate 14 is an iron disk with thickness $d_2$ of 1 to 3 mm. Note that the thickness of soft magnetic metal plate 14, which is the metal load, differs largely from magnetic circuit designs of conventional induction motors.

Figure 1B:
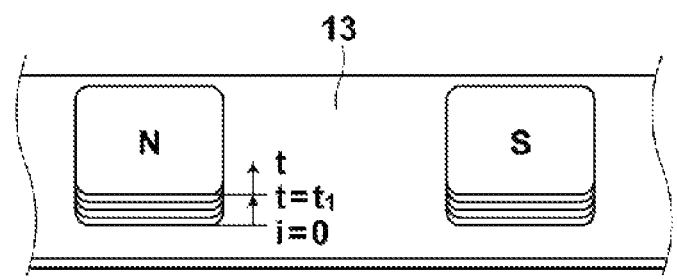
FIG. 1B illustrates an equivalent plate magnet generation process induced in an array of single turn coils.

As illustrated in FIG. 1A, SIN phase primary side magnetic flux $\Phi1$ induced by the primary excitation current flowing through stator winding 21 interlinks with the single turn coil array of single turn coil array disk 13 configured to face across a magnetic gap G, induces a voltage, and penetrates into soft magnetic metal plate 14. A secondary induced current is generated in single turn coil array disk 13 due to the induced voltage, and a secondary magnetic flux $\Phi2$ is generated due to the secondary induced current, whereby an equivalent plate magnet of induced magnetic poles having a phase delay of sing is formed, as illustrated in FIG. 1B. The primary side magnetic flux $\Phi1$ penetrant diffused into soft magnetic metal plate 14 induces an eddy current. The sum of the secondary current induced in the single turn coils and the eddy current generated in soft magnetic metal plate 14 is the secondary induced current which rotary drives rotor 11.

In the energy converter of the present invention, when the magnetic gap plane, having a rotary transformer structure, is used as the power matching plane, it is important that the electromagnetic energy transfer method between the primary side (magnetism generation mechanism unit 1 side) and secondary side (rotating mechanism unit 2 side) can be made to function as a rotary matching transformer.

Further, as shown in FIG. 4, the energy converter has a third rotor angular frequency $\omega_r$ between a primary excitation angular frequency $\omega_s$ (when drive frequency of the electrical power source is $f_g$ and the electrical angle is P, $f_s=f_g/P$, in the present example of eight coils in which four coils/phase, each group having different winding directions, are connected in series, the electrical angle is two) and a mechanical output angular frequency $\omega_m$ in order to maintain the power matching and electromagnetic accentuation effect to be described later. This allows the synchronization condition, $\omega_s=\omega_m+\omega_r$ to be constantly maintained by the self adjustment function in which the rotor angular frequency $\omega_r$ changes reversely with respect to various mechanical rotations $\omega_m$ under the fixed primary excitation angular frequency $\omega_s$. The excitation coil 21 is a core solenoid coil of concentrated winding.

The rotor, constituted by single turn coil array disk 13 and soft magnetic metal plate 14 on the rear side of the disk, viewed from the stationary side is moving at a velocity Vm (=$\omega_m \cdot r$, r is radius) and the differential velocity Vr (=Vs−Vm=$\omega_r \cdot r$) with respect to the primary side rotating magnetic field velocity Vs (=$\omega_s \cdot r$) is the velocity Vr of the secondary rotating magnetic field induced and resides in the circuit of the rotor constituted by single turn coil array disk 13 and soft magnetic metal plate 14. That is, $\omega_s = \omega_m + \omega_r$. This is also the sufficient condition of the average power conversion. This is a function not possessed by DC machines, synchronous machines, or convex machines (exSR and the like).

When a resistance component and reactance component of impedance $Z_1$ of magnetism generation mechanism unit are taken as $R_1$ and $L_1$ respectively, and a resistance component and reactance component of impedance $Z_3$ of rotating mechanism unit are taken as $R_3$ and $L_3$ respectively, if $R_1$ is set to a value smaller than a conversion value of $R_3$ converted into the magnetism generation mechanism unit side and the drive frequency $f_g$ of the electrical power source is designed to fall within a resistive frequency range in the frequency characteristics of impedances $Z_1$ and $Z_3$, the state of moving rotor circuit during operation viewed from the terminal of rotor 2 can be assessed with a high S/N ratio, so that well controllable characteristics may be obtained. When magnetism generation mechanism unit 1 and rotating mechanism unit 2 are configured as flat, separate, independent units and assembled so as to be magnetically coupled, the state of the rotor can be visually recognized and the assessment of the state of the rotor circuit becomes easy.

Next, conditions for efficiently transferring electrical power supplied by the inverter circuit will be described. That is to contrive ways of increasing secondary induced current as much as possible.

First, secondary induced current is increased by setting the frequency $f_g$ of the electrical power source to a value which falls in a frequency range in which each impedance of the stator or rotor is predominated by a resistance component without any appreciable reactance component (frequency range in which resistive impedance is predominant in the impedance frequency characteristics, which is from 100 Hz to 1000 Hz in the present example).

More specifically, consider a case in which the frequency of the excitation magnetic flux is increased in order to improve the propagation performance to the secondary side with a large magnetic gap length G. The induced voltage in the secondary side increases in proportion to the electrical power source frequency $f_g$. When the electrical power source frequency $f_g$ is in the range from 100 Hz to 1000 Hz, in the secondary rotor impedance constituted by reactance component and resistance component (substantially corresponding to eddy current resistance), the eddy current resistance that varies with the frequency and magnetic gap length G becomes predominant so that eddy current resistance slightly increases with increase in the frequency. As a result, the secondary induced current obtained by dividing the secondary induced voltage by the eddy current resistance slightly increases with increase in the frequency.

Further, maximum power is transferred to the eddy current resistance, which is the secondary metal load, by performing power matching through the rotating matching transformer with the magnetic gap plane as the power matching plane. As described later, it is most preferable that the eddy current resistance is an eddy current resistance at a drive frequency $f_g$ that maximizes the eddy current and designed in this way.

More specifically, secondary induced current caused by an electromotive force induced by a primary side magnetic flux $\Phi_1$ generated by a primary excitation current flowing through the stator winding flows through the single turn coil, and the induced current generates a secondary magnetic flux $\Phi_2$, whereby an induced equivalent plate magnet (induced magnetic poles) having a phase delay of sing is formed. The primary side magnetic flux $\Phi_1$ penetrant diffused into the direct metal load having a magnetic permeability and an electrical conductivity of soft magnetic metal plate 14 closely attached to the rear surface thereof induces an eddy current and appears as a frequency depended eddy current resistance, so that a maximum effective power is supplied by power matching with respect to the eddy current resistance. This refers to that eddy current resistive load $R_3$ (including single turn coil resistance) is resistance matched with the sum of the drive source internal resistance $R_g$ and stator winding resistance $R_1$ ($R_g + R_1 = n^2 \times R_3$) through power matching rotating transformer. Here, the n represents an equivalent effective turn ratio of the magnetism generation mechanism unit when the coil turn of the rotating mechanism unit is taken as one turn with the magnetic gap plane as the matching plane. As the frequency characteristic of the impedance shows, $R_3$ varies depending on the frequency, applied voltage, and magnetic gap length G.

The values of $Z_1$, $R_1$, $Z_3$, and $R_3$ are measured and obtained by connecting two terminals of the magnetism generation mechanism unit (for one phase) to be connected to the electrical power source. When the rotating mechanism unit is not mounted, the stator winding impedance $Z_1$, and resistance $R_1$ and reactance $L_1$ of the impedance $Z_1$ may be measured. Then, after the rotating mechanism unit is mounted, impedance $Z_2$ between the two terminals added with rotor impedance $Z_3$, including resistance $R_3$ and reactance $L_3$, may be measured. Thereafter, the impedance frequency characteristic of $Z_1$ is subtracted from the impedance frequency characteristic of $Z_2$ to obtain impedance characteristic of $Z_3$. The measurement is performed using a large amplitude signal for electric power.

The number of effective turns n is calculated by taking into account the leakage of magnetic field, generated by the magnetism generation mechanism unit, from magnetic gap length G. More specifically, when the magnetic gap length is taken as zero (0), the magnetic leakage does not occur, and resistance component $R_3$ is calculated as $R_3 = A/N^2$ from $A = N^2 R_3$ obtained by calculation. Here, the value of N is the actual number of turns of the coil because there is no magnetic leakage. Next, the number of effective turns n is calculated, when the magnetic gap length is k which is greater than zero (k>0), from resistance $B = n^2 R_{3\,(G=k)}$ calculated by the method described above using the relational expression of $n = \sqrt{(B/A)} \times N$. Here, the number of turns of the secondary coil is one turn. The eddy current is forcibly maintained by forcible and magnetic accentuation effect that occurs through the relative relationship between the material specific time, determined by the relationship between energy storage and consumption in the soft magnetic metal plate of the rotor, and electrical excitation time. Basically, the eddy current is induced by the magnetic flux penetrant diffusing in the metal load of the soft magnetic metal plate by lossy interaction. As the low frequency and sinusoidal steady state eddy current wave could possibly be attenuated or extinguished, it might be difficult to identify the time by which the eddy current becomes maximum through low frequency sinusoidal drive frequency response.

For understanding the aforementioned event within a transient phenomenon, step function response method is the most appropriate method. In the present embodiment, magnetic flux Φ1 of a certain magnetic pole is injected and the magnetic flux is attracted by the opposite pole, and temporal progress of internal pattern of the magnetic flux penetrant diffusing into the inside of the metal load of the soft magnetic metal plate disposed therebetween and eddy current is considered. That is an internal distributive behavior of transient phenomenon. Next, bias in the attenuation of penetrant diffusion due to movement will be conceptually described.

Figure 1C:
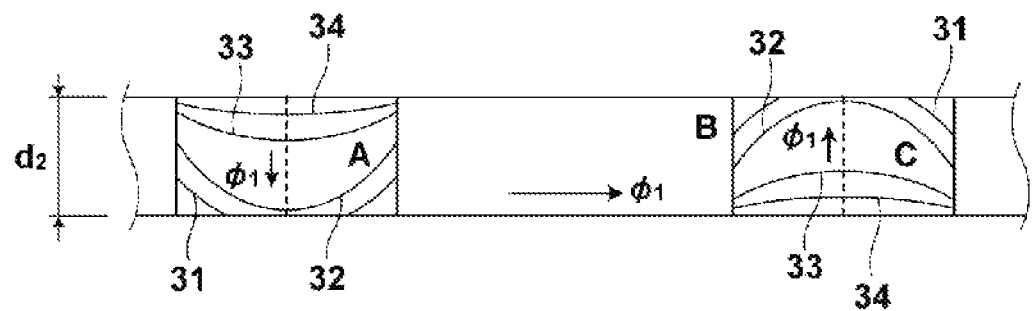
FIG. 1C is a schematic view illustrating a penetrant diffusion process of stator magnetic flux in the soft magnetic metal plate of the rotor.
Figure 1D:
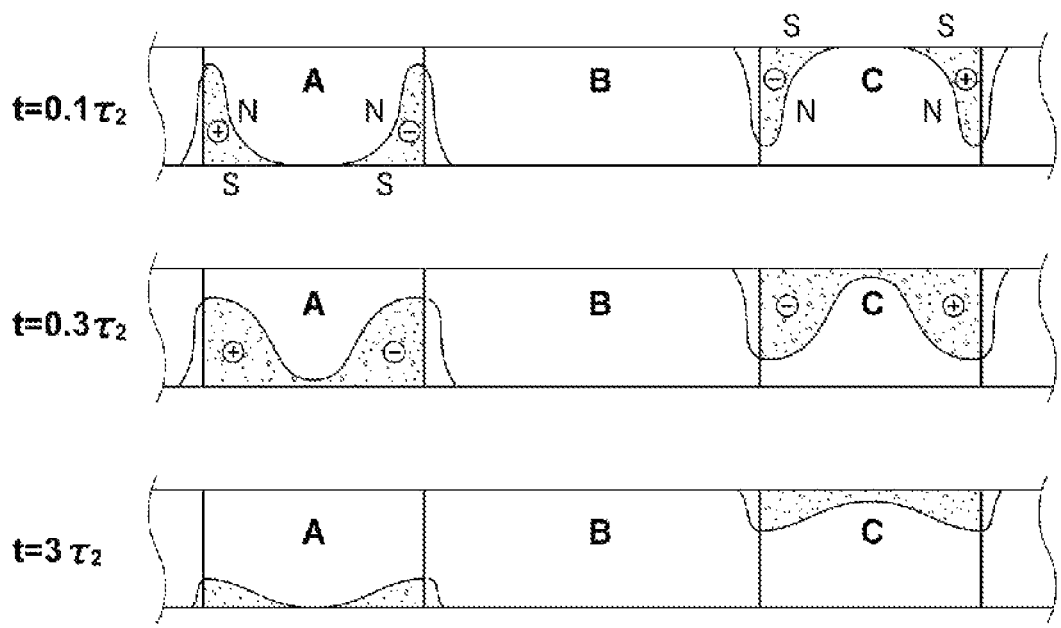
FIG. 1D is a schematic view illustrating a penetrant diffusion process of stator magnetic flux in the soft magnetic metal plate of the rotor.

More specifically, time constant $\tau_2$ of penetrant diffusion of the first magnetic flux in soft magnetic metal plate 14 between the pole pair will be discussed. FIGS. 1B, 1C, and 1D conceptually illustrate the temporal generation process of an equivalent plate magnet in the single turn coil array of the rotor, temporal penetrant diffusion process of the magnetic flux into the metal load of soft magnetic metal plate on the rear side of the coil array, and behavior of the time constant $\tau_2$. FIG. 1B illustrates the temporal generation process of an equivalent plate magnet in the single turn coil array. In FIG. 1C, magnetic flux Φ1 flows in the arrow direction. For example, soft magnetic metal plate is divided into A, B, C, and D blocks along the direction of one phase of Sin magnetic flux. The magnetic flux in B block flowing in the circumferential direction is not involved in the torque generation at all and B block acts only as the magnetic path, so that the B block is excluded from the discussion. The B block under sin magnetic flux acts as A or C block with respect to cos magnetic flux. Thus, each block has both functions to induce eddy current by penetrant diffusing the magnetic flux in the thickness direction and to act simply as the magnetic path at the same time and in constantly changing manner, but instantaneous behavior of the magnetic flux in the thickness direction of the soft magnetic metal plate and the influence of a circumferential velocity V are studied at the same time.

FIG. 1C schematically illustrates penetrant diffusion patterns of magnetic flux Φ1 in the A, B, C, and D blocks when t=0.1$\tau_2$, t=0.3$\tau_2$, t=$\tau_2$, and t=3$\tau_2$ (represented by solid lines 31, 32, 33, and 34 respectively). FIG. 1D illustrates eddy current patterns when t=0.1$\tau_2$, t=0.3$\tau_2$, and t=3$\tau_2$ (represented by dots). FIG. 1D also illustrates conceptual included equivalent magnets with the upper side as N pole and the lower side as S pole.

Figure 2:
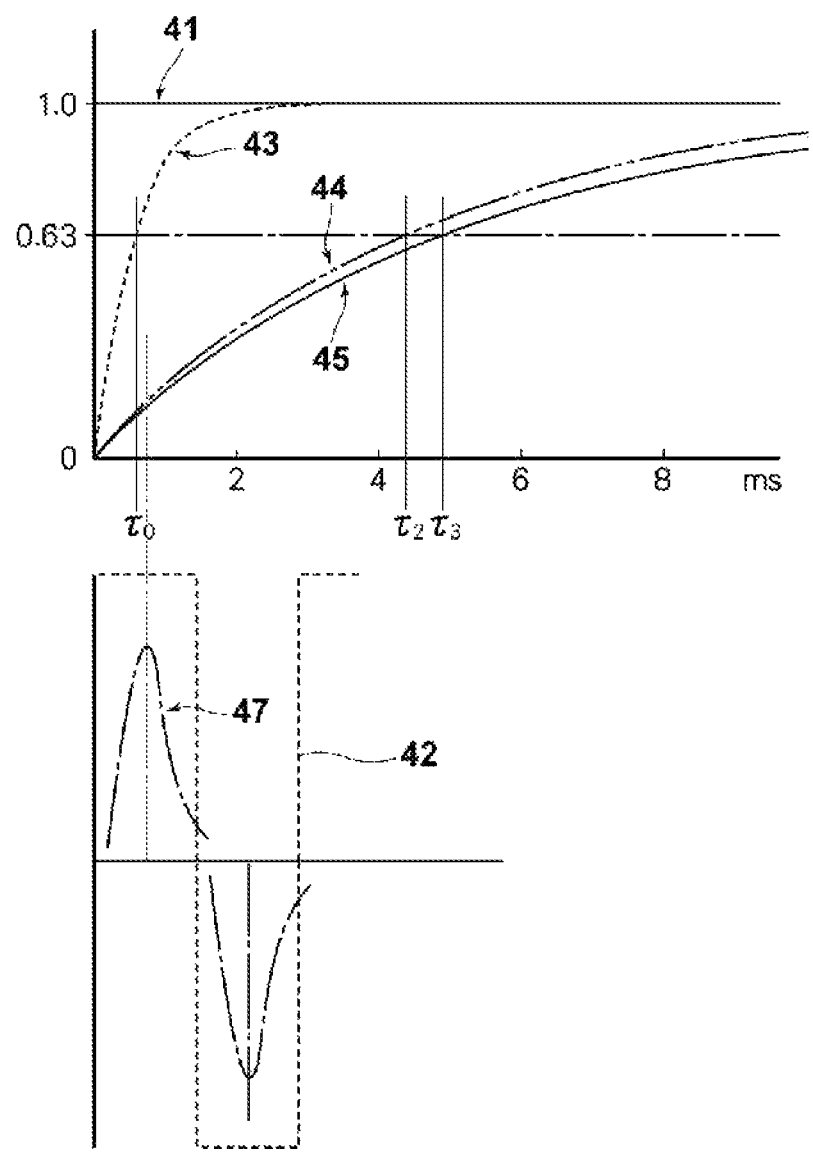
FIG. 2 is a graph qualitatively illustrating penetrant diffusion of stator magnetic flux in the soft magnetic metal plate of the rotor.

Next, the distributive transient phenomenon in the soft magnetic metal plate will be reconsidered in a lumped parameter manner with reference to FIG. 2. When a step response voltage 41 that facilitates understanding of transient phenomenon is applied to the stator winding from the electrical power source, primary excitation current 43 with a time constant $\tau_0$=0.5 ms and a primary magnetic flux ($\Phi_1$) associated with the primary excitation current are generated. Further, the generated magnetic flux is interlinked with the single turn coil array across the magnetic gap length G, whereby an induced equivalent plate magnet is generated by the secondary induced current with a delay of sin γ≠0 (time constant $\tau_1$=0.21 ms). The induced equivalent plate magnet gradually disappears after a total time constant of $\tau_0$+$\tau_1$=0.71 ms in the case of step response (where, time constant $\tau_1$ at the time of generating the induced equivalent plate magnet is 0.21 ms, L/R=0.1035 μH/0.49 mΩ, d1=2.5 mm, and aluminum specific resistance ρ=2.62×10$^{-8}$ Ωm). In the magnetic flux penetrant diffusion process on the rear side metal load with a thickness of d2=2.0 mm (conductivity σ=1.7×10$^6$ mohm/m, magnetic permeability μ=5000μ$_0$, 4% Si—Fe with μ$_0$=4π× 10$^{-7}$ H/m), the primary excitation current at 0$^+$ time is zero, so that the penetrant diffusion wave is also zero. The basic time constant $\tau_2$ (=μσd$^2$/π$^2$) is 4.33 ms and the process is indicated by the reference numeral 44. But in the magnetic flux penetrant diffusion process, the actual time constant $\tau$=$\tau_2$+$\tau_0$ of stator winding which amounts to 4.83 and the process of which is indicated by the reference numeral 45 in FIG. 2.

Next, eddy current behavior will be discussed. The temporal pattern of the eddy current path in the magnetic flux penetrant diffusion into the soft magnetic metal plate (metal load) with a thickness of 2.0 mm located directly below the rear side of the single turn coil is, for example, a cyclic path in which eddy current Id becomes large as the depth is close to the surface with zero Id in the center, and the inner eddy current Id gradually decreases as the magnetic flux diffuses, like about 0.5Id of the eddy current at the diffusion time of 0.1$\tau_2$ after 0.3$\tau_2$, about 0.3Id after $\tau_2$, and about 0.05Id after 3$\tau_2$ (as one dimensional problem). The total eddy current obtained by performing integration with respect to the penetrant diffusion with the primary excitation current at 0$^+$ time is zero and a penetrant diffusion wave is not present, so that the eddy current is also zero.

When a sufficient time has elapsed, exceeding the time constant $\tau_2$, the penetrant diffusion is completed, DC magnetic flux flows, and eddy current generated in the magnetic flux penetrant diffusion process and the associated eddy current resistance disappear. In the process in which the eddy current starts from zero and ends with zero, there exists a local maximum for the eddy current. In the mean time, the combined time constant $\tau_3$ is 4.83 (0.5 ms+4.33 ms) in the magnetic flux penetrant diffusion process.

When the behavior of the distribution inside the surface is treated as a single turn hollow inductor in a lumped parameter manner, the temporal differentiation of the rising curve of the magnetic flux penetrant diffusion wave, except for a region adjacent to zero which becomes impulse, corresponds to an induced voltage curve, and the division of the induced voltage curve by the eddy current resistance of the load will give an eddy current curve 47 in the same phase and shape as those of the induced voltage curve without any phase delay. The eddy current curve is acute except for a region adjacent to zero which should be attributable to a maximum value of the inclination of the magnetic flux penetrant diffusion wave.

Figure 6:
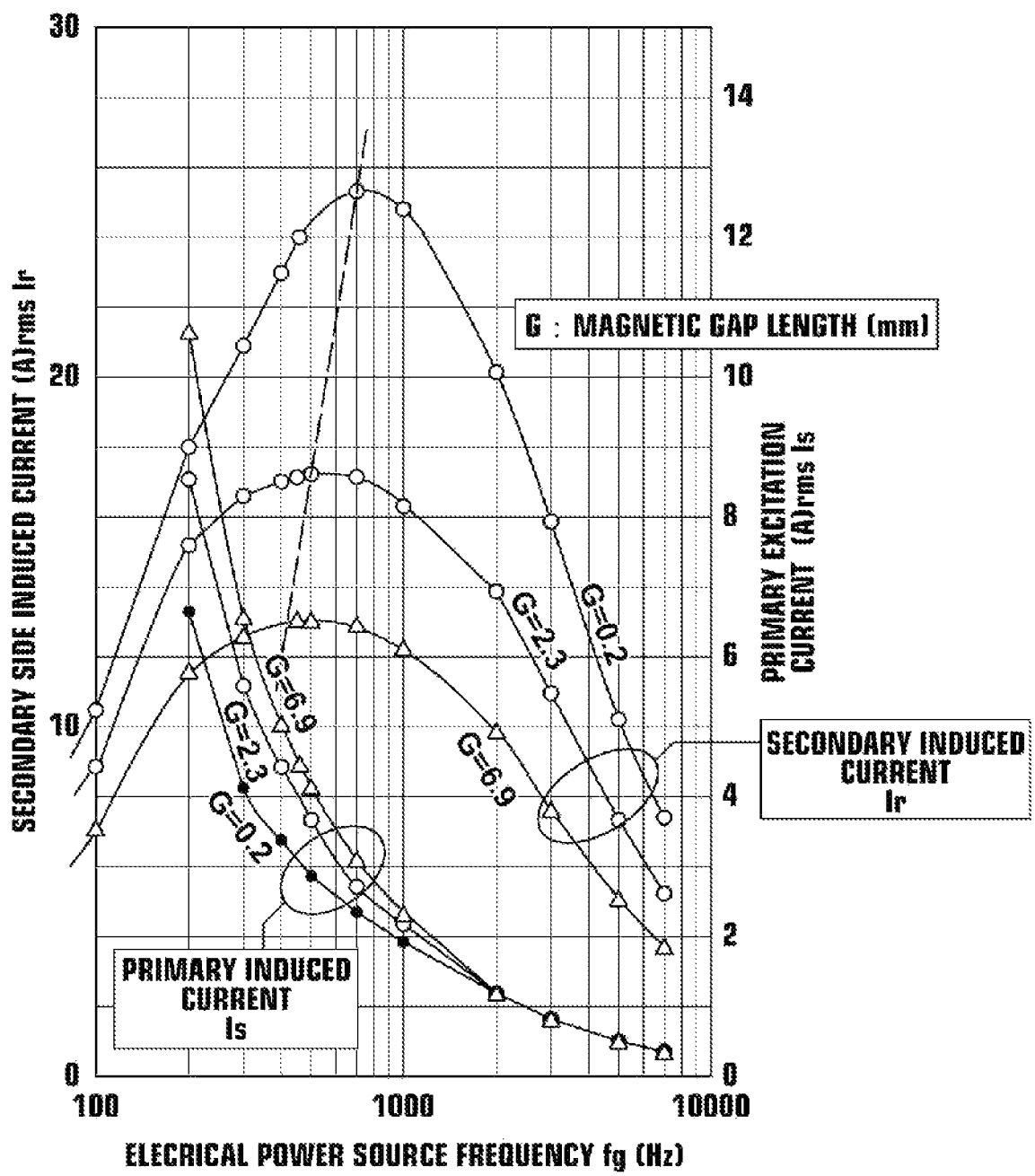
FIG. 6 is a graph illustrating the electrical power source frequency vs frequency characteristics of secondary induced current in the rotor.

The eddy current resistance, however, is a variable constant that varies with the change in the flow path of the eddy current. Therefore, the collective representation of the variable constant circuits can be regarded as the eddy current behavior to be obtained within the transient phenomenon. The behavior of the total amount of integration of an ever changing current path in the soft magnetic metal plate (bowl like shape in the thickness direction of the metal with ever changing periphery height and thickness, which will eventually disappear after changing to a plate like shape) can be learned with a search coil encompassing the center and periphery of the plate. FIG. 6 illustrates frequency characteristics of secondary induced current for one phase with respect to the drive frequency of the electrical power source, showing a broad unimodality.

In the present embodiment, the measurement may be made with the aforementioned search coil or an array of magnetoresistive elements, but they are not provided yet at this time, so that $t_d$ is obtained by B-H hysteresis method of FIG. 7 ($t_d$ is obtained from the area or magnetic flux density) to be described later and used for this discussion. In this example, the eddy current reaches a maximum value about 0.7 ms after the application of step function primary excitation voltage and then gradually decreases to zero. Further, it has been found that the time $t_d$ that maximizes the eddy current exists in the value of 0.1 to 0.2 times the sum $\tau_3$ of the time constant $\tau_0$ of the stator winding and the time constant $\tau_1$ of the penetrant diffusion wave. This represents the allowable range of Formula (1).

In the case of sine wave drive, a maximum eddy current may be obtained by setting the period $T_g$ of the sine wave $T_g=0.7\times2\times2=2.8$ ms, i.e., $f_g=375$ Hz, and setting electrical power source frequency $f_g$ in the range of 375 Hz$\leq f_g \leq$714 Hz. Accordingly, in the present prototype converter, a maximum eddy current was obtained by providing electromagnetic accentuation state that sustains the lossy eddy current of the metal plate at a large value. At that time, power matching state was achieved with respect to the eddy current resistance across the magnetic gap plane and whereby the transmission effect was improved.

As illustrated in FIG. 1A, the single turn coil array and soft magnetic metal plate move in the right direction at a circumferential velocity V. This movement causes the temporary pattern of the magnetic flux penetrant diffusion wave, i.e., the temporary pattern of the eddy current, to have a left slanted shape (not shown) because the attenuation rate of the penetrant diffusion wave in the same direction as the circumferential velocity V is small in comparison with case in which V=0 and the attenuation rate increases in the direction opposite to the circumferential velocity V. The disturbance of the pattern due to the movement causes the intensity of the induced equivalent magnet to be slanted to the left which indicates a phase delay. The phase delay may bring the essential condition $\sin \gamma \neq 0$ of average energy conversion condition closer to more effective condition of $\sin \gamma=1$, in addition to time delay of the magnetic flux diffusion wave. That is, this can be presumed to be one of the important requirements for torque improvement.

FIG. 2 illustrates the aforementioned process qualitatively and in a lumped parameter manner. In FIG. 2, graph 41 illustrates an application voltage for primary excitation (step response), graph illustrates a rectangular application voltage for primary excitation (400 Hz), graph 43 illustrates current response characteristic with respect to the stator primary winding (time constant $\tau_0=0.5$ ms), graph 44 illustrates time response $\tau_1$ of primary magnetic flux penetrant diffusion wave with respect to the metal load (soft magnetic plate 14) of the rotor, graph 45 illustrates time response (time constant $\tau_2=4.83$ ms) of primary magnetic flux penetrant diffusion wave with respect to the metal load (soft magnetic plate 14) of the rotor taking into account the primary current response time constant $\tau_0=0.5$ ms, and graph 47 qualitatively illustrates time response of eddy current under combined time constant 4.83 ms, taking into account the primary current response time constant $\tau_0=0.5$ ms, of the penetrant diffusion wave.

Hereinafter, a method of determining material characteristics for soft magnetic metal plate 14 will be described. Electrical power source frequency $f_g$ is determined such that the loop area of B-H hysteresis curve becomes maximum when the magnetic field strength of the magnetism generation mechanism unit is taken as H and magnetic flux density of the rotating mechanism unit is taken as B. The area of the B-H hysteresis loop expands in an oval shape from a narrow loop area with increase in the frequency. The loop area becomes maximal at a certain frequency and then the loop changes to left slope loop or right slope loop with rapid decrease in the area as the frequency is increased. The expansion of the loop is caused by the eddy current and the maximum area implies a maximum eddy current, so that the frequency $f_g$ of electrical power source 15 at which the loop area of the B-H systeresis loop becomes maximum is determined.

This frequency is determined by sweeping the electrical power source frequency and determining the point at which the loop area of the B-H systeresis curve becomes maximum. Here, the loop area of the B-H hysteresis curve may be obtained with an oscilloscope in the following manner. That is, one phase of excitation current in magnetism generation mechanism unit (corresponding to the magnetic field strength H) is inputted to X-axis of the oscilloscope, and an integrated alternate current flowing through the single turn coil and soft magnetic metal plate on the rear side thereof detected by a search coil is inputted to Y-axis of the oscilloscope to display a Lissajous figure and the area of the Lissajous figure is obtained. In this way the frequency $f_g$ is determined. This refers to that the drive signal period $T_g$ of the electrical power source corresponds to a value of four times the response time $t_d$ from the time when a voltage is applied by the electrical power source to the time when the eddy current caused by the magnetic flux penetrant diffusion wave in the soft magnetic metal plate becomes maximum.

Figure 7:
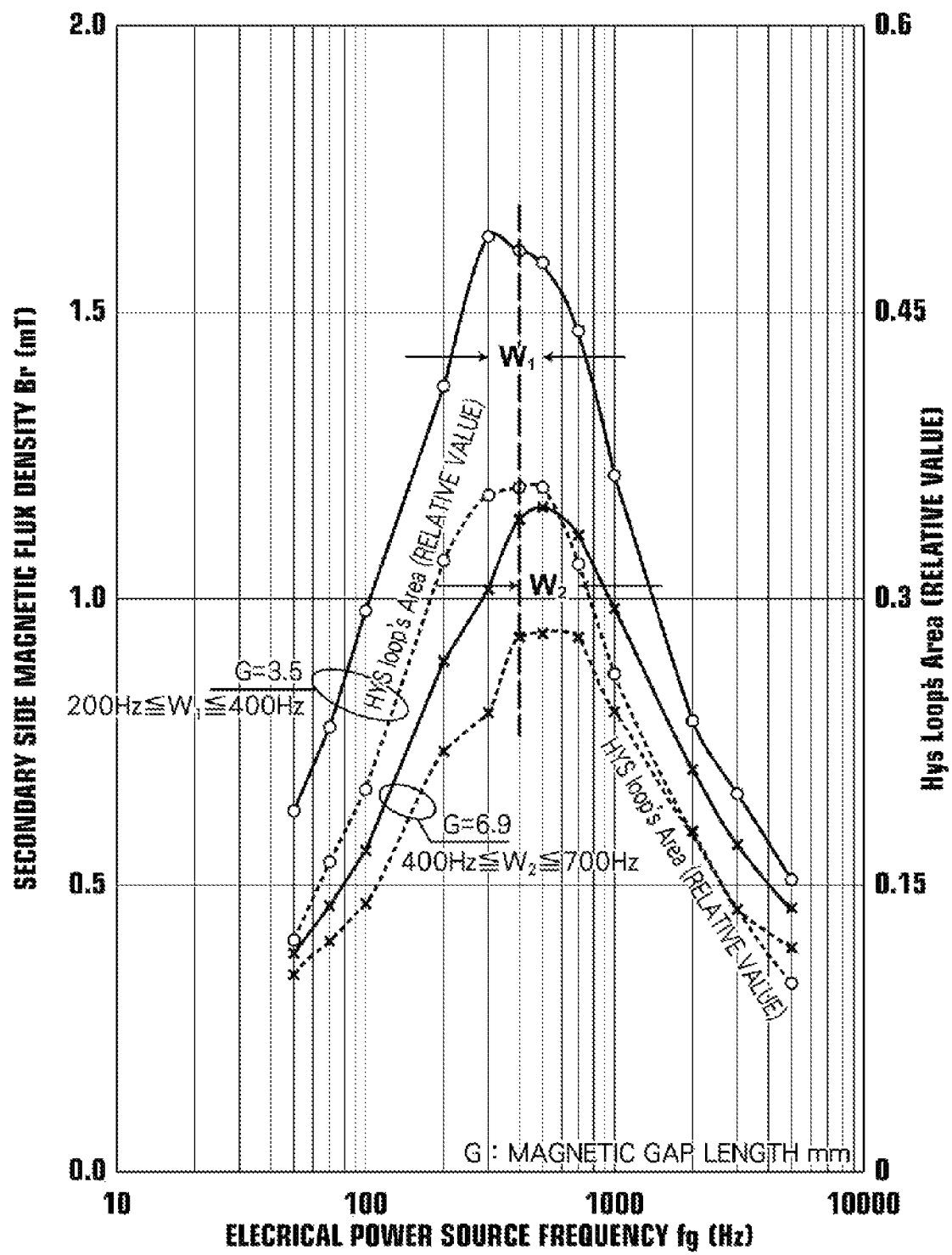
FIG. 7 illustrates B-H magnetic characteristics when regarded as an equivalent magnetic material having a gap.

FIG. 7 suggests that the area curve of the B-H hysteresis loop and secondary side (rotor) magnetic flux density curve with respect to the electrical power source frequency are analogous and, therefore, the maximum of the magnetic flux density may be regarded as the maximum of the loop area. Here, the determination of the electrical power source frequency is performed under non-power-matching state.

Next, where the stator winding impedance $Z_1$ of the magnetism generation mechanism unit is $Z_1=R_1+j\omega_sL_1$ and a conversion value of rotor impedance $Z_3$ of the rotating mechanism unit $Z_3=R_3+j\omega_sL_3$ converted into the magnetism generation mechanism unit side is $n^2Z_3=n^2(R_3+j\omega_sL_3)$, study will be made centered on resistance $R_1$ such that resistance matching of $R_g+R_1=n^2R_3$ is achieved when the frequency $f_g$ determined in the manner described above is in a resistive frequency region that satisfies the conditions of $Z_1 \approx R_1$ and $n^2Z_3 \approx n^2R_3$. This is done comprehensibly to narrow down within 3 dB. Here, $Z_1 \approx R_1$ refers to that the influence of the $\omega_sL_1$ is negligibly small. Further, $n^2Z_3 \approx n^2R_3$ refers to that the influence of the $j\omega_sL_3$ is negligibly small.

Figure 8:
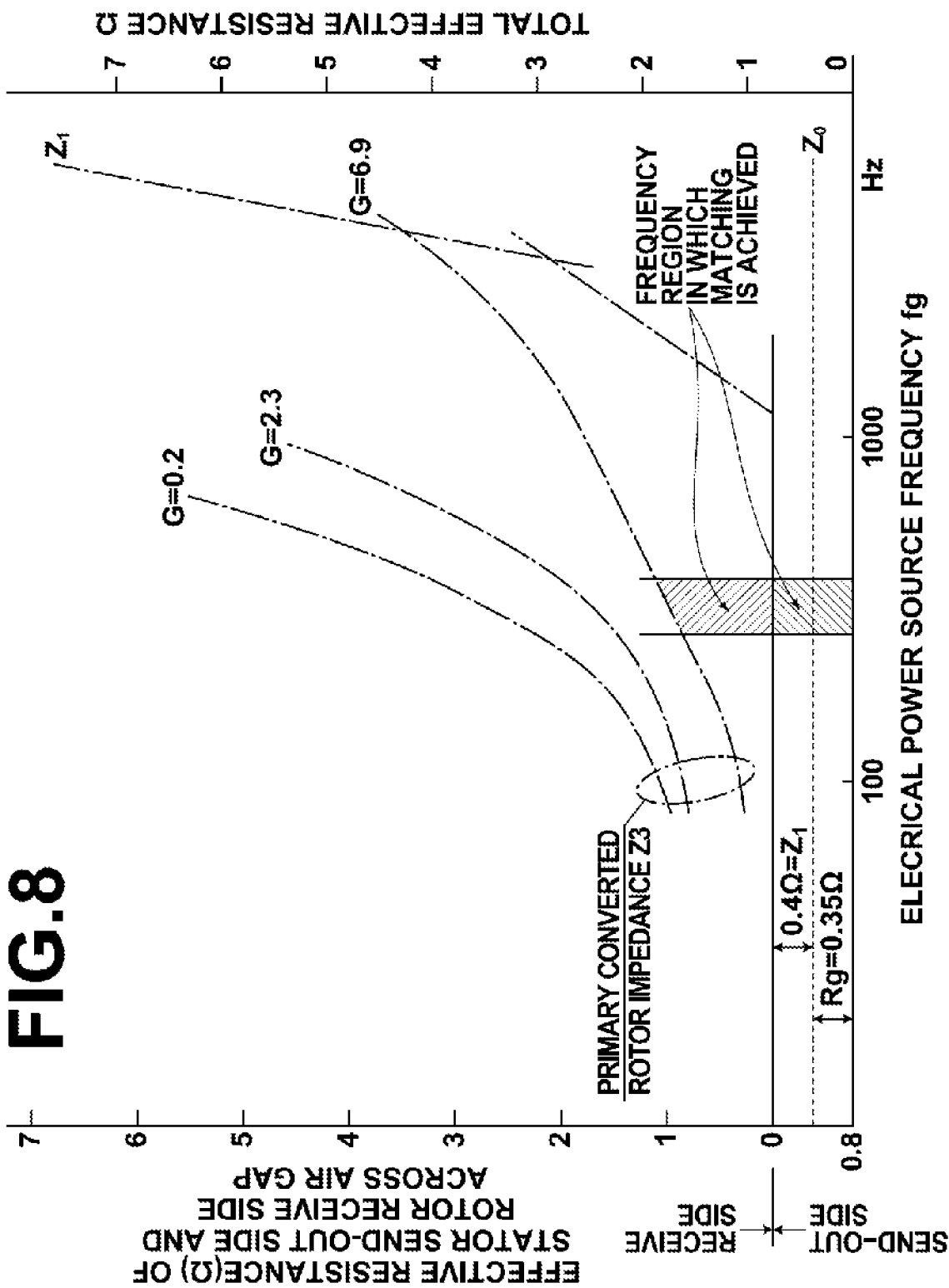
FIG. 8 illustrates the frequency dependency of matching condition between stator resistance including the resistance of the electrical power source and primary converted eddy current resistance of the rotor.
Figure 9:
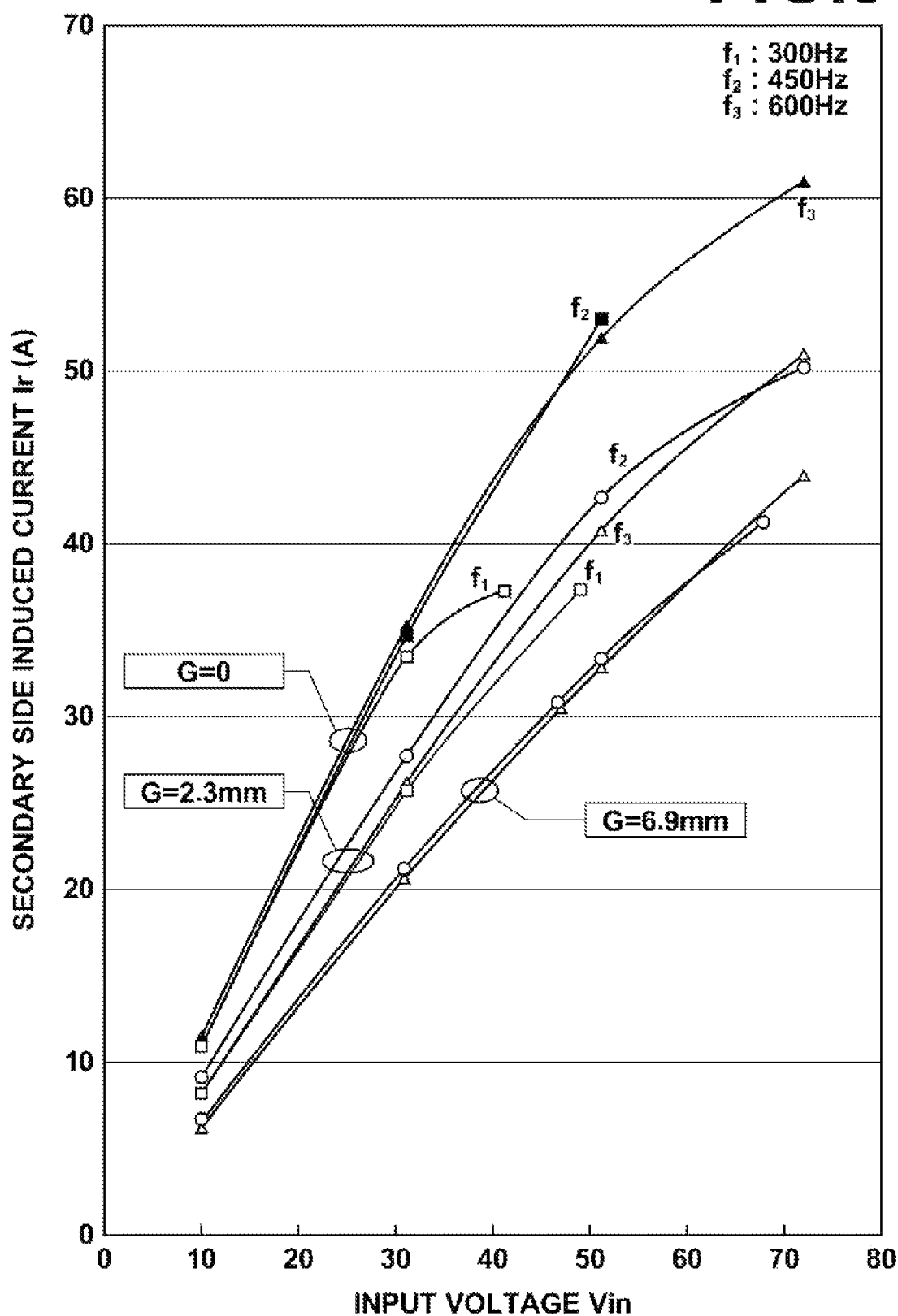
FIG. 9 is a graph illustrating the primary side input voltage vs secondary induced current characteristics.

When the magnetic gap length is 7 mm, the frequency at which the area of the hysteresis loop shown in FIG. 7 becomes maximum (also the maximum of the magnetic flux density) is 400 Hz. Here, $4\times t_d=4\times0.7$ ms=2.8 ms which is 357 Hz, substantially corresponding to 400 Hz. In the mean time, the frequency in which resistance matching is achieved is also 400 Hz, as shown in FIG. 8.

The energy converter of the present invention further includes a control unit for performing control such that the mechanical rotations of the rotating mechanism unit having a predetermined magnetic gap length G is constantly maximized on grounds that it is natural that the period at which the eddy current in the rotating rotor circuit and the eddy current resistance at that time are dependent on the applied voltage and drive signal period, and the eddy current distribution pattern is also velocity dependent.

At the start-up moment $t=0^+$, both the primary and secondary sides are in the state of power transformer of alternating magnetic flux ($\Phi1$) with primary excitation angular frequency $\omega_s$. As the rotor having a mechanical angular frequency $\omega_s$ is established by the movement of the rotor, the rotor angular frequency $\omega_r=\omega_s-\omega_m$ is inevitably generated in the moving rotor circuit and, viewed from the stator side, the relationship of $\omega_s=\omega_m+\omega_r$ always holds true. This is also the sufficient condition of the average power conversion. The slip s of an induction motor is $s=\omega_r/\omega_s$. Here, the essential condition is $\sin \gamma \neq 0$. With the high speed revolution of the moving rotor (V/r, V is circumferential velocity and r is radius), the alternating magnetic field ($\Phi1$) becomes unable to penetrant diffuse in soft magnetic metal plate 14 due to surface eddy current and the function as the closed magnetic circuit material is lost except for the surface and falls into a hollow core like state. The evaluation index for this is the magnetic Reynolds number Rm and the state may be estimated with the value of one as the border, but the measurement of the magnetic Reynolds number, which is also the evaluation index of the moving rotor, is difficult and remained to be solved in the future.

Further, mechanical output may also be maximized by performing power matching. For example, in a case where the load is not a dry load but a velocity dependent viscous load, such as electric fan, when the internal resistance of a mechanical output source which is in a resistive region is identical to the resistance of the viscous load in the mechanical output characteristic of an induction motor, resistance matching is achieved on the mechanical output side and the maximum of the mechanical output becomes the operating point.

Further, as described above, the electrical power source frequency $f_g$ and mechanical output drive frequency $f_s$ are set so as to satisfy the relationship of $f_s = f_g/\rho$, in which $\rho$ is electrical angle number. Here, the electrical angle number p refers to the number of electrical cycles in one mechanical cycle ($2\pi$) and corresponds to ½ of the number of magnetic excitation poles (number of N-S pole pairs) for one phase in one mechanical angle ($2\pi$). For example, for two-phase drive with eight excitation coil poles, the number of excitation magnetic poles is four and the electrical angle number is two.

Figure 5:
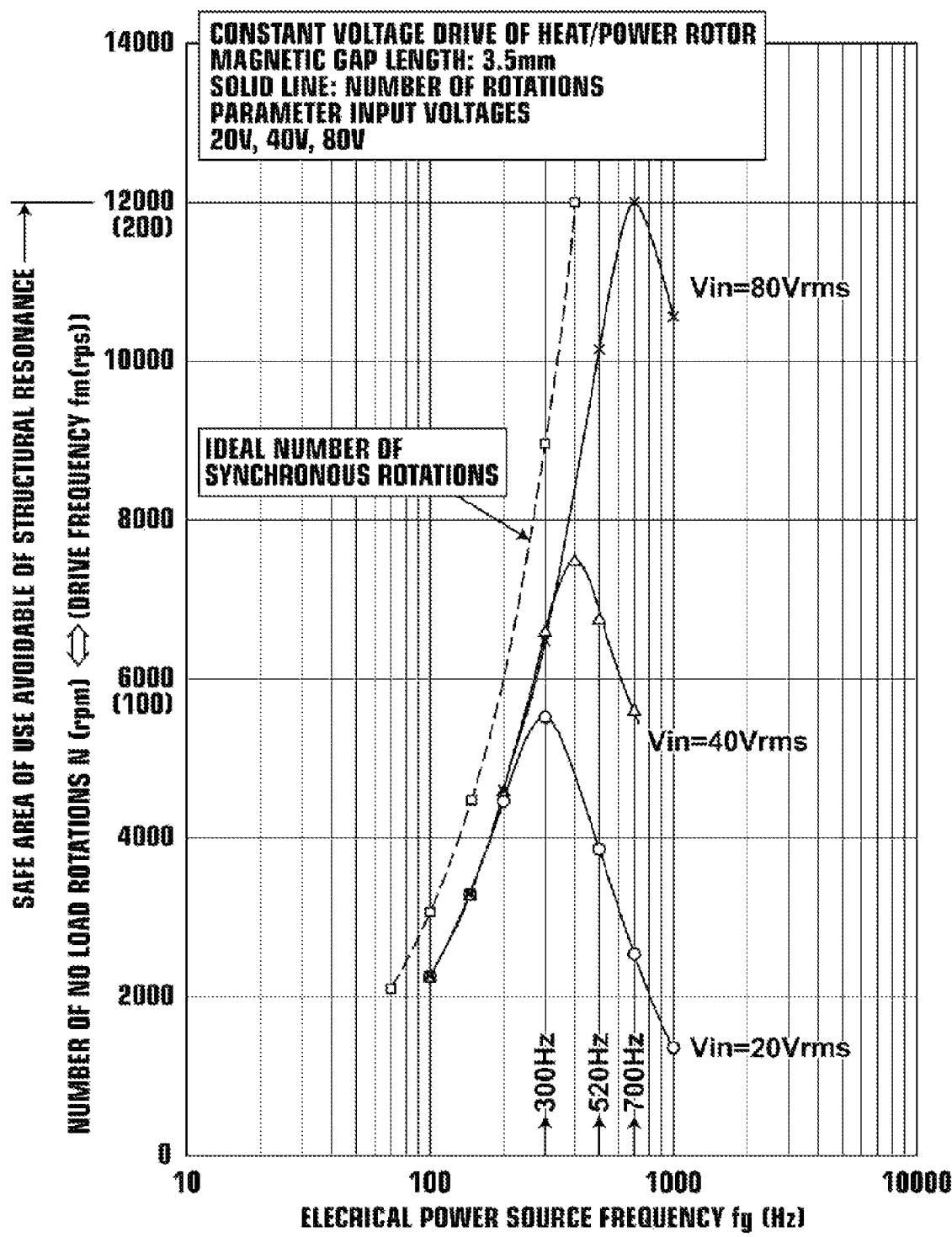
FIG. 5 is a graph illustrating the electrical power source frequency vs number of no-load rotations and input electric power characteristics.

By satisfying the conditions described above, a strong and slightly delayed induced variable electromagnet was obtained with a large magnetic gap length of nearly 10 mm. FIG. 5 illustrates, by way of example, heat/power rotor characteristics that obtained heat and power at the same time under no load condition. In particular, the amount of degradation from the ideal number of no load rotations is due to increase in the iron loss of the rotor, but for a novel application in which the iron loss heat is also utilized effectively, comparable performance may be expected in cost vs size, overall efficiency, and the like in comparison with a typical induction machine. When the primary excitation angular frequency $\omega_s$ is 400 Hz, magnetic gap length G is 7 mm, and input voltage is 70V, an acute 44A secondary current could be induced. At maximum, 70A secondary current could be induced.

Mechanical output characteristics of the present energy converter experimentally produced showed a drooping characteristic like that of a DC motor.

In the energy converter of the present invention, an arrangement may be adopted in which a rotating magnetic field for rotary driving and an alternating magnetic field for induction heating are generated at the same time or selectively in the magnetism generation mechanism unit by the electrical power source, and rotary driving operation and induction heating operation are performed independently and actively by the rotor of the rotating mechanism unit. In each case, according to the aforementioned configuration, the efficiency of energy transfer from the magnetism generation mechanism unit to the rotating mechanism unit may be improved and sufficient energy output for household use may be ensured from the rotating mechanism unit with a large magnetic gap length of, for example, about 10 mm. For example, the separately and removably formed cordless heat/power rotor housing that actively employs lossy eddy current without using a rare metal magnet may provide core technology of the next generation kitchen system, such as an underwater heat source or power source for a sink with dishwasher function, underwater use for an up-down movable chair in a bathtub, provision of a power source of a mixer for an existing IH table, an under-floor ventilator hidden in a manner so-called "hidden in the leaves", and the like.

Further, the energy converter of the present invention may be used by selecting an appropriate rotor housing for the intended function.

For example, where a large torque is required, a heat/power rotor housing having an epicyclic gear mechanism, like that shown in FIG. 2 in which a large torque is obtained by the deceleration through epicyclic gear mechanism 17, 18, and 19 in rotating mechanism unit 2 is used. Otherwise, a power based thick wound core rotor housing may be used for that purpose.

Further, the technology may also be used for a special flat induction motor (tandem), such as a flat two rotor with one stator type, having, as a result, a large magnetic gap length (double magnetic gap length). Such tandem stacking structure (multi-tandem) may be used as a drive power source for small vehicles, agricultural instruments, or bicycles.

Still further, the separable feature and rotor magnetic property that can withstand a high temperature near 300° C. allow the rotor to be used as a power source under a special environment of high temperature furnace.

The flat heat/power feature rotor can naturally be modified to a cylindrical shape. In this case, a hollow cylindrical rotor is formed and water or air may be introduced therein to give heat and rotational force at the same time. For example, circulating hot water of a 24-hour bath may be introduced to heat/power characteristic rotor in the hollow cylinder to heat the water while obtaining a power source for the circulation.

The energy converter of the present invention differs largely from the conventional converters, in which the copper loss of the winding in the magnetism generation mechanism unit is reduced as much as possible (about $0.5\Omega$/phase in the experimental production) and the rotor heat source is also used effectively. This may largely contribute to the efficiency improvement. Further, the rating is defined individually for the magnetism generation mechanism unit and rotating mechanism unit, and then the overall rating is determined.

The operation and application of the energy converter of the present invention has been described mainly focusing on the rotor and flat induction motor having a separable rotor, but the present invention may also be applied to an integral structure and cylindrical type.

FIGS. 5 to 9 show data of the induction motor of the present invention.

In producing the experimental sample, the study has been made with reference to MIT core curriculum, Electrodynamics I, II by H. H. Woodson and J R. Melcher.

The invention claimed is:
1. An energy converter, comprising
a magnetism generation mechanism unit that generates a magnetic field when connected to an AC electrical power source; and
a rotating mechanism unit having a single turn coil array member in which a plurality of single turn coils is disposed at a predetermined interval and a soft magnetic metal plate disposed on a side of the single turn coil array member opposite to the magnetism generation mechanism unit, the rotating mechanism unit being structured such that the single turn coil array member faces the magnetism generation mechanism unit across a predetermined magnetic gap and rotary driven by the magnetic field,
wherein a drive signal period of the electrical power source is a period that maximizes an eddy current generated in the soft magnetic metal plate, wherein the drive signal period $T_g$ of the electrical power source satisfies a condition represented by Formula (1) given below.

$$T_g = 4t_d \qquad (1)$$

(where, $t_d$ is a response time for eddy current due to a magnetic flux penetrant diffusion wave into the soft magnetic metal plate to become maximum with respect to predetermined stepwise voltage application by the electrical power source and $t_d$ is determined experimentally).

2. The energy converter of claim 1, wherein, at the drive signal period $T_g$ of the electrical power source, a resistance matching condition, with the magnetic gap as the matching plane, represented by Formula (2) given below is satisfied.

$$R_g + R_1 = n^2 R_3 \qquad (2)$$

(where, $R_g$ is an internal resistance of the electrical power source, $R_1$ is a winding resistance of the magnetism generation mechanism unit, $R_3$ is a combined resistance of an eddy current resistance due to flow of eddy current generated by the penetrant diffusion of magnetic flux of the magnetic field into the soft magnetic metal plate and a resistance of the single turn coil array member, and n is an equivalent effective turn ratio of the magnetism generation mechanism unit when a coil turn of the rotating mechanism unit is taken as one turn with the magnetic gap as the matching plane).

3. The energy converter of claim 1, wherein the drive signal period $T_g$ of the electrical power source is a period that maximizes a B-H hystereresis loop area formed by magnetic field strength H of the magnetism generation mechanism unit and induced magnetic flux density B in the rotating mechanism unit.

4. The energy converter of claim 3, wherein, at the drive signal period $T_g$ of the electrical power source, a resistance matching condition, with the magnetic gap as the matching plane, represented by Formula (2) given below is satisfied.

$$R_g + R_1 = n^2 R_3 \qquad (2)$$

(where, $R_g$ is an internal resistance of the electrical power source, $R_1$ is a winding resistance of the magnetism generation mechanism unit, $R_3$ is a combined resistance of an eddy current resistance due to flow of eddy current generated by the penetrant diffusion of magnetic flux of the magnetic field into the soft magnetic metal plate and a resistance of the single turn coil array member, and n is an equivalent effective turn ratio of the magnetism generation mechanism unit when a coil turn of the rotating mechanism unit is taken as one turn with the magnetic gap as the matching plane).

5. The energy converter of claim 1, wherein the rotating mechanism unit is a unit that includes an epicyclic gear mechanism.

6. The energy converter of claim 1, further comprising a control unit for controlling the drive signal period $T_g$ of the electrical power source and application voltage such that the number of mechanical rotations of the rotating mechanism unit is maximized.

7. The energy converter of claim 1, wherein the magnetism generation mechanism unit is a flat magnetism generation mechanism unit in which coils are disposed in a circle, and the single turn coil array member and the soft magnetic metal plate have a flat shape or a disk like structure.

8. The energy converter of claim 1, wherein the magnetism generation mechanism unit has a cylindrical structure, the single turn coil array member of the rotating mechanism unit has a basket like structure, and the soft magnetic metal plate has a hollow cylindrical structure.

\* \* \* \* \*